United States Patent
Kalaboukis et al.

(10) Patent No.: US 9,762,693 B2
(45) Date of Patent: Sep. 12, 2017

(54) METHODS AND SYSTEMS FOR DELIVERY OF INFORMATION TO A MOBILE COMPUTING DEVICE BASED ON PRIORITY OF THE INFORMATION

(71) Applicant: EXCALIBUR IP, LLC, New York, NY (US)

(72) Inventors: Chris Kalaboukis, Los Gatos, CA (US); Marc Davis, Berkeley, CA (US); Ron Martinez, San Francisco, CA (US)

(73) Assignee: EXCALIBUR IP, LLC, New York, NY (US)

( * ) Notice: Subject to any disclaimer, the term of this patent is extended or adjusted under 35 U.S.C. 154(b) by 0 days.

(21) Appl. No.: 14/299,565

(22) Filed: Jun. 9, 2014

(65) Prior Publication Data

US 2014/0280735 A1    Sep. 18, 2014

Related U.S. Application Data

(63) Continuation of application No. 11/617,451, filed on Dec. 28, 2006, now Pat. No. 8,769,099.

(51) Int. Cl.
| | |
|---|---|
| *G06F 15/16* | (2006.01) |
| *H04L 29/08* | (2006.01) |
| *G06Q 30/02* | (2012.01) |
| *H04W 4/00* | (2009.01) |

(52) U.S. Cl.
CPC ......... *H04L 67/2847* (2013.01); *G06Q 30/02* (2013.01); *H04W 4/00* (2013.01)

(58) Field of Classification Search
None
See application file for complete search history.

(56) References Cited

U.S. PATENT DOCUMENTS

| | | | | |
|---|---|---|---|---|
| 6,976,210 | B1 * | 12/2005 | Silva | G06F 17/30867 707/E17.109 |
| 7,343,564 | B2 * | 3/2008 | Othmer | H04M 1/72572 340/995.1 |
| 2004/0111476 | A1 * | 6/2004 | Trossen et al. | 709/206 |
| 2005/0055426 | A1 * | 3/2005 | Smith | G06F 17/30902 709/219 |
| 2005/0091111 | A1 * | 4/2005 | Green et al. | 705/14 |
| 2005/0114511 | A1 * | 5/2005 | Davis | G06F 11/3438 709/226 |

(Continued)

*Primary Examiner* — Joshua Joo
(74) *Attorney, Agent, or Firm* — James J. DeCarlo; Greenberg Traurig, LLP

(57) ABSTRACT

Disclosed are systems and methods for delivery of information to a mobile computing device. A remote computing device detects the occurrence of a first user event that precedes an associated second user event. The remote computing device identifies information corresponding to the associated second user event. The remote computing device determines a first priority of the information associated with the second user event and a second priority of a second information associated with the second user event. The remote computing device determines that the first priority is higher than the second priority. In response to detecting the occurrence of the first user event, the remote computing device transmits, to a mobile computing device, the information having the first priority before transmitting the second information having the second priority.

20 Claims, 5 Drawing Sheets

(56) References Cited

U.S. PATENT DOCUMENTS

| | | | |
|---|---|---|---|
| 2006/0101514 A1* | 5/2006 | Milener | G06F 17/30902 726/22 |
| 2006/0135179 A1* | 6/2006 | Aaltonen | H04L 67/06 455/456.3 |
| 2006/0173841 A1* | 8/2006 | Bill | 707/6 |
| 2006/0277277 A1* | 12/2006 | Landschaft | H04L 67/2842 709/220 |
| 2007/0130518 A1* | 6/2007 | Shavit | G06F 17/2229 715/205 |
| 2007/0149214 A1* | 6/2007 | Walsh et al. | 455/456.1 |
| 2008/0086455 A1* | 4/2008 | Meisels | G01C 21/26 |
| 2010/0198691 A1* | 8/2010 | Yates | 705/14.58 |

* cited by examiner

METHODS AND SYSTEMS FOR DELIVERY OF INFORMATION TO A MOBILE COMPUTING DEVICE BASED ON PRIORITY OF THE INFORMATION

This application is a continuation of and claims the benefit of U.S. patent application Ser. No. 11/617,451 filed Dec. 28, 2006, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Increasingly, users of mobile computing devices are requiring greater and more frequent access to information located at remote computing devices. For example, users are increasingly retrieving information that corresponds to certain events, times and/or locations. Information such as Internet content, advertisements, and application data (e.g., traffic congestion or weather data) are but a few of many example of the information that is regularly sent to users of mobile computing devices. However, despite an increasing demand for information at mobile computing devices, the bandwidth for transmitting information to mobile computing devices and the storage capacity at mobile computing devices often lag behind or are insufficient to meet the increasing user demands. Furthermore, the growth of mobile devices as a real-time marketing and transaction channel creates an even greater need for having the most relevant information available on a mobile device at a needed time and place without delay. Thus, there exists a need for methods and systems to intelligently transmit to and store information on mobile computing devices.

SUMMARY

Against this backdrop systems and methods have been developed for pre-caching information on mobile computing devices. In one example (which example is intended to be illustrative and not restrictive), the present invention may be considered a method for pre-caching information. The method includes, based upon spatial information or temporal information associated with a user of a mobile computing device, detecting the occurrence of a first user event that precedes an associated second user event that will occur at a known time. The method further includes identifying information corresponding to the associated second user event that will occur at the known time. The method also includes, in response to detecting the occurrence of the first user event, transmitting to the mobile computing device the information corresponding to the associated second user event that will occur at the known time.

In another example (which example is intended to be illustrative and not restrictive), the present invention may be considered a method for pre-caching information. The method includes, based upon spatial information or temporal information associated with a user of a mobile computing device, detecting the occurrence of a first user event that precedes an associated second user event that may occur after the first user event. The method further includes identifying information corresponding to the associated second user event that may occur after the first event. The method also includes, in response to detecting the occurrence of the first user event, transmitting to the mobile computing device the information corresponding to the associated second user event that may occur after the first user event.

In yet another example (which example is intended to be illustrative and not restrictive), the present invention may be considered a system for delivering information prior to a user event. The system includes a user event module, in communication with a remote computing device, wherein the user event module maintains user events associated with at least one user of at least one mobile computing device. The system further includes an event information module, in communication with a remote computing device, wherein the event information module maintains information corresponding to events associated with the at least one user of the at least one mobile computing device. The system also includes a management module, on the remote computing device, wherein the management module detects a first user event and identifies information corresponding to a second user event associated with the first user event. The system further includes a communications module, in communication with the management module, wherein the communications module is adapted to transmit, prior to a known or probable occurrence of the second user event, the information corresponding to the second user event to the at least one mobile computing device in communication with the remote computing device via a communications network.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

Figure 1:
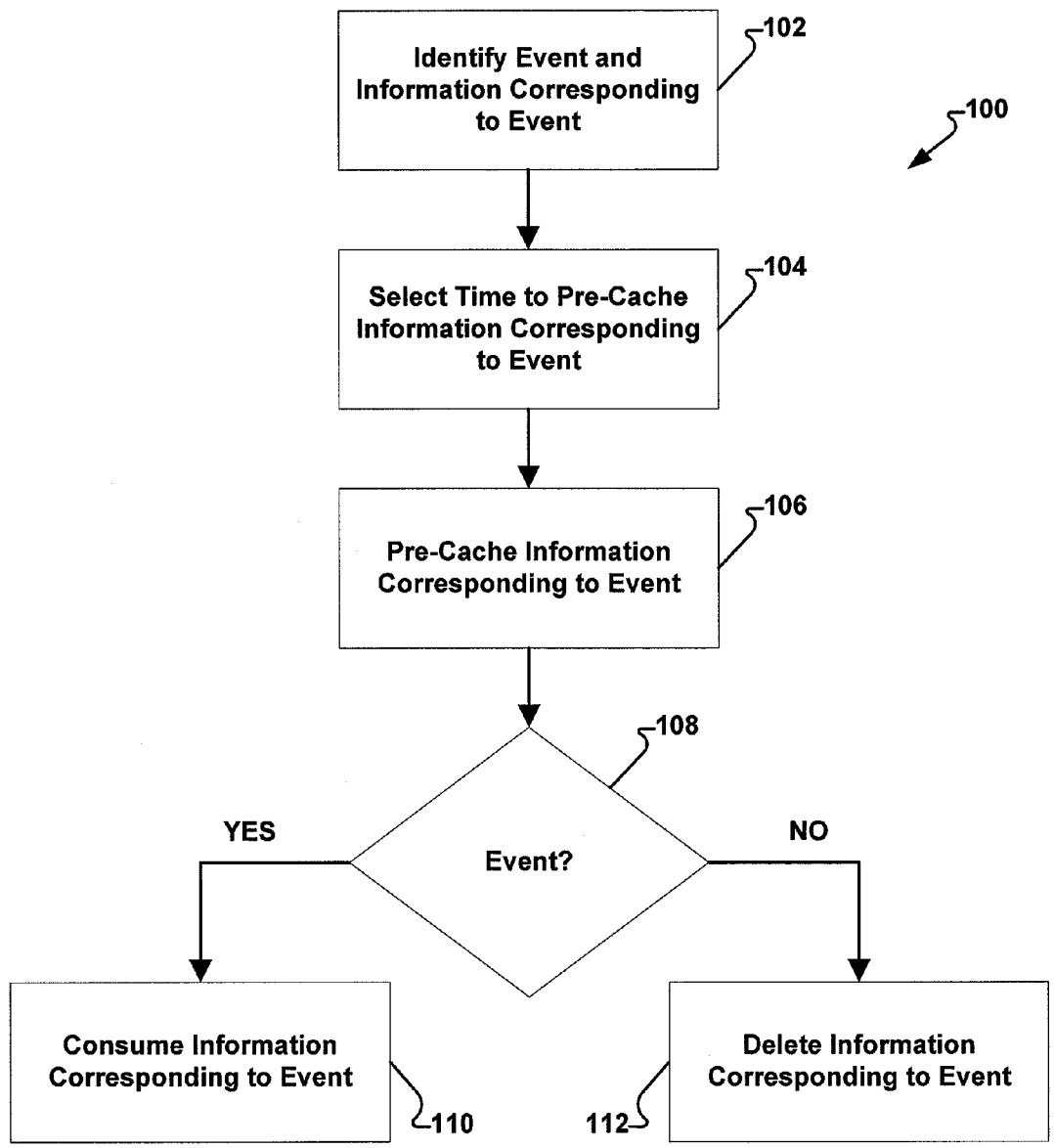
FIG. 1 is a schematic view illustrating a high-level embodiment of a high-level method for pre-caching information on a mobile computing device.

FIG. 1 is a schematic view illustrating a high-level embodiment of a high-level method 100 for pre-caching information on a mobile computing device. In the method 100, an event and information corresponding to an event are identified in an identifying operation 102. As used within this disclosure, the associated figures and the appended claims, an "event" is used to generally describe something that happens at a place and/or time. One skilled in the art will recognize that events may take many forms, including but not limited to an occurrence, often generated by a user, to which a computer might respond (e.g., a key press), a processing event, a calendar event, and events based upon a change in the location of a thing or based upon a change in time. In one embodiment of identifying operation 102, an event may be comprised of a spatial or temporal event, such as a location or time. For example, a mobile computing device may report its location (e.g., the "Eiffel Tower" or geographic coordinates) or a time (e.g., the notification of a calendar entry having a beginning time or end time may represent the event). As another example, a scheduled data transmission may comprise an event. In one embodiment of an identifying operation 102, the information corresponding to the event may be comprised of spatial information. For example, the event may be comprised of the location (e.g., geographic coordinates or a network location) of a mobile computing device or a location corresponding to an appointment scheduled on a user's calendar (e.g., the place where the appointment takes place). In another embodiment of an identifying operation 102, the information corresponding to the event may be comprised of temporal information. For example, the information corresponding to an event may include a time or a duration of time.

The method 100 further comprises selecting a time to pre-cache information corresponding to an event in selection operation 104. In one embodiment, the time selected precedes the event such that the information corresponding to the event may be pre-cached or stored prior to an occurrence of the event. For example, where an event comprises a calendar entry location (e.g., identifying the location of a dinner reservation in a user's calendar), the information corresponding to the event (e.g., a coupon for the restaurant) may be stored prior to a user reaching the location or the time of the calendar entry.

In a further embodiment, the amount of time preceding an event may correspond to the size of the information corresponding to the event that will be sent before the occurrence of the event. For example, where an event occurs in five minutes, the information corresponding to the event may be reduced or chosen such a way as to ensure delivery prior to the event. Following this example, where there is more than one type of information to send to a mobile computing device (e.g., a low-resolution image and a high-resolution image), it may be easier to send the less resource-intensive information where the event may occur before the high resource-intensive information could be received. In another embodiment, the amount of time preceding an event may correspond to the bandwidth or transmission capacity that is available to deliver information corresponding to an event to a mobile computing device. Following the previous example, it may be preferable to send less resource-intensive information (e.g., a low-resolution image) where the transmission capacity for sending information to a mobile computing device is limited. In yet another embodiment, the information corresponding to an event may be prioritized such that the information is transmitted to a mobile device according to its priority. For example, where there exists very little time before the occurrence of an event, it may be more efficient to transfer information corresponding to priority such that information having a higher priority is transferred before information having a lower priority.

The method 100 further comprises pre-caching information corresponding to the event in a pre-caching operation 106. In one embodiment, a pre-caching operation 106 may involve transmitting information and/or saving information. In one embodiment, a pre-caching operation 106 may store information on a storage device, including but not limited to volatile memory (e.g., RAM), associated with a mobile computing device. By way of illustration, a pre-caching operation 106 may involve the steps of retrieving information corresponding to an event, transmitting the retrieved information to a mobile computing device and storing the information in memory or some other storage device associated with the mobile computing device.

In a decision operation 108, the method 100 further comprises deciding whether an identified event occurred. For example, deciding operation 108 may comprise deciding whether a user's mobile computing device reported that the user entered a certain location corresponding to an identified event. If, as is set forth in consuming operation 110, the event is determined to have occurred, the information corresponding to the event may be consumed in a consuming operation 110. For example, where the information corresponding to the event comprises one or more images, the information may be displayed. Similarly, where the information corresponding to the event comprises audio information, the information may played through a speaker. Alternatively, in a deleting operation 112, if the event was determined not to have occurred, the information corresponding to the event may be deleted. For example, if the event is determined not to have occurred, the information corresponding to the event may gradually or instantaneously be removed from a storage device. As another example, where an event is determined to not have occurred, the information corresponding to an event may be replaced or deleted when new information is received at the mobile computing device. As yet another example, where an event is determined to not have occurred, the information corresponding to an event may trigger yet another event and/or the transmission of information. One skilled in the art will recognize that deleting events may take many forms that are within the scope of this disclosure. For example, by way of illustration and not of limitation, the deletion of an event may occur in response to receiving a meeting cancellation notice.

Figure 2:
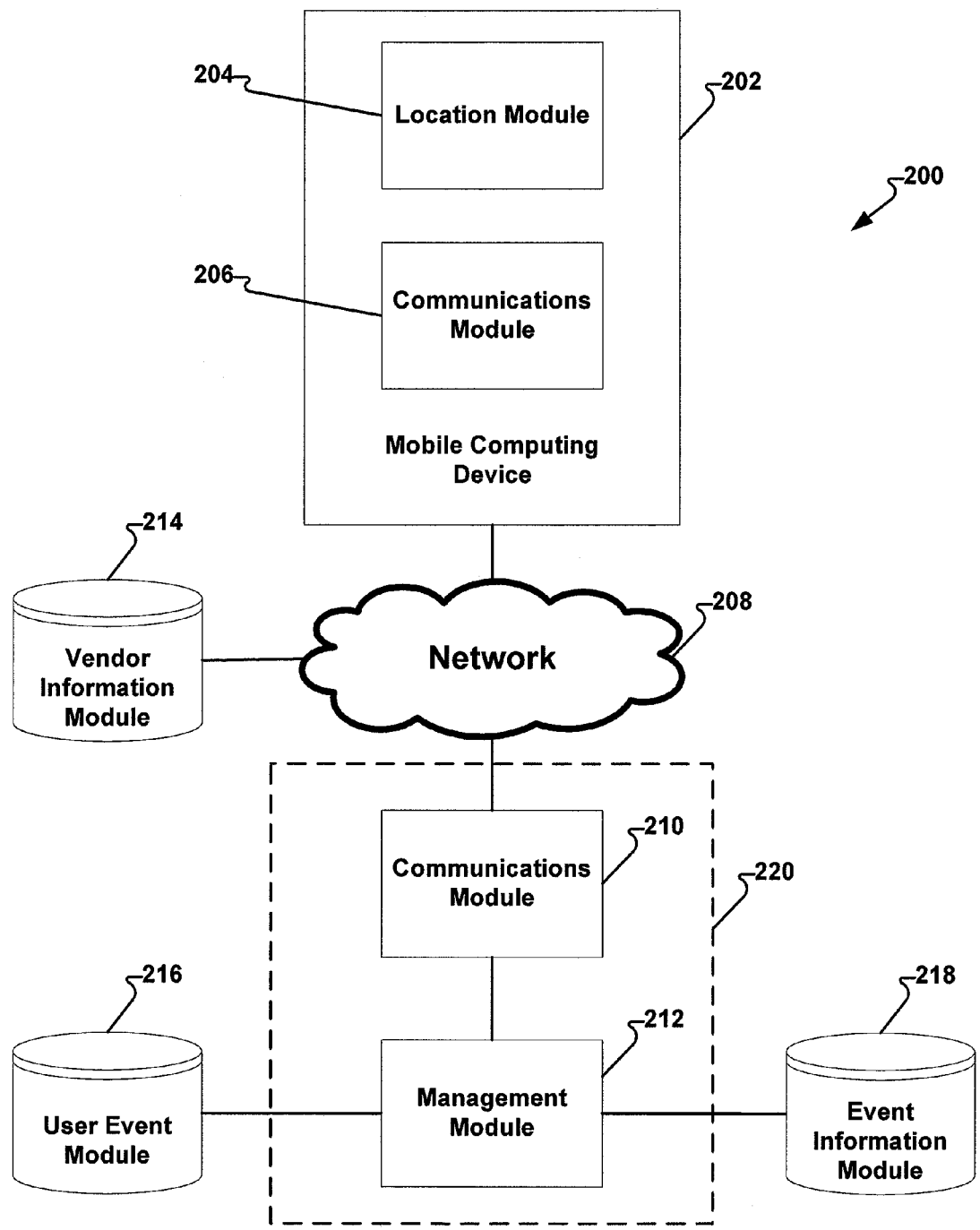
FIG. 2 is a schematic view illustrating one embodiment of a system for delivering information prior to a user event.

FIG. 2 is a schematic view illustrating one embodiment of a system 200 for delivering information prior to a user event. In one embodiment, the system 200 is comprised of a mobile computing device 202. One skilled in the art will recognize that a mobile computing device 202 may take many forms, including but not limited to computing devices that may utilize a battery for power. In one embodiment, a mobile computing device 202 may comprise a cell phone, a personal digital assistant, a mobile data terminal, a notebook computer or similar device. In another embodiment, a mobile computing device 202 may comprise a portable and/or wirelessly connected computing device. As set forth in the illustration of system 200 in FIG. 2, a mobile computing device 202 may further be comprised of a location module 204 and a communications module 206. In one embodiment, a mobile computing device may be comprised of a location module 204 that itself, among other things, may determine spatial (i.e., location) information or receives spatial information. For example, a location module 204 may be comprised of one or more components that may utilize the Global Positioning System ("GPS") to determine a location of a mobile computing device 202. As another example, a location module 204 may identify a network location for the mobile computing device 202 by utilizing information transmitted to and/or from a communications network including but not limited to a cellular (GPRS), Bluetooth, radio, satellite or wireline communications network 208. In one embodiment, a mobile computing device 202 also comprises a communications module 206. A communications module 206 may be comprised of one or more components that permit communication between a mobile communications device 202 and a communications network 208. In one embodiment, one or more components comprising a communications module 208 may be integrated with or comprise the same one or more components of a location module 204.

In one embodiment, the system 200 is further comprised of a remote computing device 220. In one embodiment, a remote computing device 220 may be comprised of one or more than one computing device. In one embodiment, a remote computing device 220 may include a communications module 210. A communications module 210 may be comprised of one or more components that permit communication between a remote computing device 220 and a communications network 208. In another embodiment, a communications module 210 may be adapted to transmit, prior to a known or probable occurrence of the second user event, information corresponding to a second user event to at least one mobile computing device 202 in communication with a remote computing device 220 via a communications network 210.

In one embodiment, a system 200 is further comprised of a management module 212. In one embodiment, a management module 212 may detect a first user event maintained within a user event module 216 that maintains user events associated with at least one user of at least one mobile computing device 202. For example, where a user event module 216 comprises one or more computers and/or storage devices, a management module 212 of a remote computing device 220 may search user event records stored within the user event module 216 for a record corresponding to a mobile computing device 220. In one embodiment, a management module 212 of remote computing device 220 may also identify information corresponding to a second user event associated with the first user event. For example, a management module 212 may be connected to an event information module 218 that stores information corresponding to user events. In this example, a management module 212 may search for information matching or otherwise related to a user event maintained in a user event module 216. In one embodiment, the event information module 218 maintains information corresponding to events associated with the at least one user of the at least one mobile computing device 202.

In another embodiment, a system 200 may be further comprised of a vendor information module 214 that maintains vendor information that may correspond to a user event, for example, as may be stored in a user event module 216.

Figure 3:
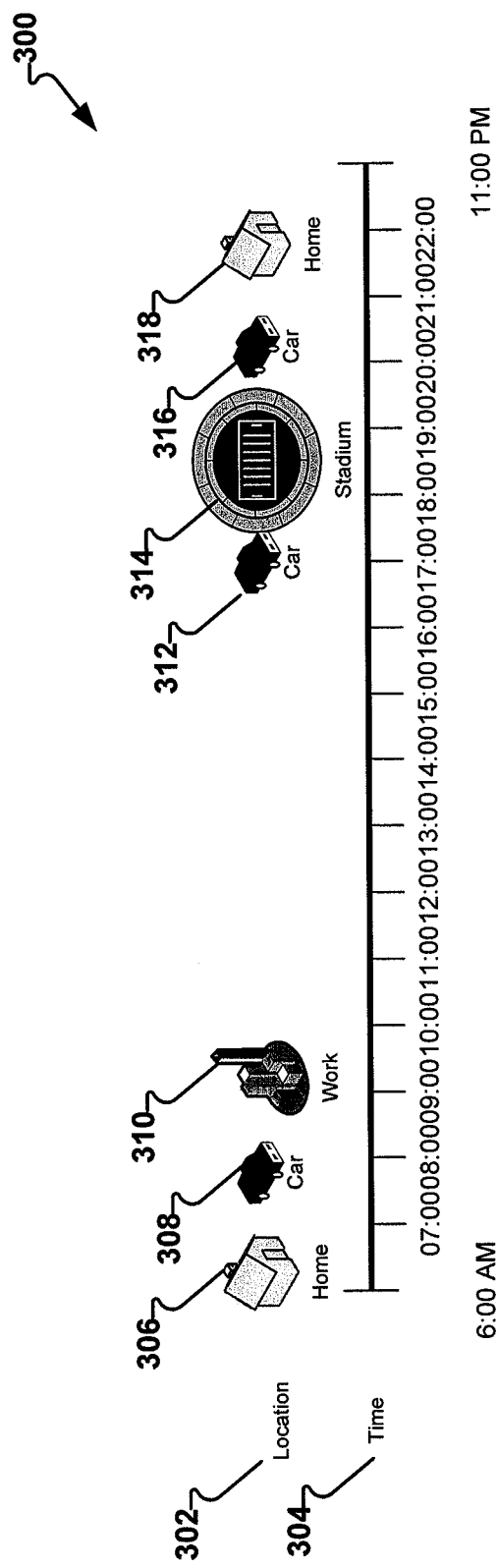
FIG. 3 is a schematic view illustrating an event timeline corresponding to one embodiment of a method for pre-caching information on a mobile computing device.

FIG. 3 is a schematic view illustrating an event timeline 300 corresponding to one embodiment of a method for pre-caching information on a mobile computing device. As illustrated in FIG. 3, the events comprising an event timeline 300 may be comprised of spatial events, such as events occurring at a location 302, and temporal events, such as events occurring at a time 304. For example, and as illustrated in FIG. 3, events may include an event with a beginning and ending time, such as an arrival at home event 318 and departure from home event 306. As another example, and as further illustrated in FIG. 3, events may include events with a duration such as driving events 308, 312, 316, a work event 310 or a stadium event 314. In one embodiment, events may be of a known duration, such as a work event 310 that may last for a known time period such as from 9 A.M. to 5 P.M. In another embodiment, events may be of an uncertain or probable duration, such as a stadium event 314 that may last for an unknown duration but nonetheless (e.g., in the case of an NBA basketball game) is unlikely to last beyond a certain duration (e.g., three or four hours).

In one embodiment of an event timeline 300 corresponding to an embodiment of a method for pre-caching information on a mobile computing device, information comprising traffic conditions corresponding to a driving event 308, 312, 316 (e.g., an associated second user event) may be transmitted to a mobile computing device during the occurrence of an arrival at home event 318, departure from home event 306, work event 310 and/or a stadium event 314 (e.g., each, respectively, may be considered a first user event to a following event in an event timeline 300). In one embodiment, information corresponding to more than one associated second user event may be delivered at one time. For example, prior to a second user event (e.g., a stadium event 314), information for a driving event 312 (e.g., directions to the stadium) and a stadium event 314 (e.g., one or more vendor coupons from food and/or beverage vendors at the stadium) may be transmitted to a mobile computing device upon the occurrence of a first user event such as driving event 308 or work event 310. Temporal events may thus be represented numerically or semantically so as to afford calculations of absolute temporal relations, constrained temporal relations, or relative temporal relations. Temporal relations are discussed generally in Allen, J. F., Maintaining Knowledge about Temporal Intervals, Communications of the ACM 26, 11, 832-843 (November 1983) (see http://www.cs.rochester.edu/u/james/), which is hereby incorporated herein by reference as if it were set forth in its entirety. For example, temporal events may be expressed as numeric values (e.g., a certain number of minutes, seconds or hours between a start time and an end time) which may be absolute, probabilistic, partly indeterminate, variable, or constrained. As another example, temporal events may be expressed as relative symbolic values (e.g., a temporal event may be before, after, adjacent to, overlap with, start with, finish with, contain, be contained by, or equal another temporal event) which may be absolute, probabilistic, partly indeterminate, variable, or constrained. As yet another example, temporal events may be expressed as semantic values (e.g., an absolute or relative time that may depend upon a contextual condition, such as geography). By way of illustration, and not of limitation, such semantic values might include a relative time (e.g., "sunset" or "winter") that may change or result in a different numeric time depending upon a geographic location (e.g., "sunset" varies both by different time zones and different latitudes, and "winter" is temporally inverted depending on southern versus northern hemisphere). In addition, temporal events may have periodic recurrence patterns (both regular and irregular periodic recurrence patterns) that determine their similarity and relevant sequencing. By way of illustration, and not of limitation, such relative values might include a holiday (e.g., "Christmas" or "Passover"), a day of a week (e.g., "Tuesday"), a month (e.g., "January"), a life event (e.g., "a birthday" or "an anniversary"), or a recurring appointment (e.g., "weekly status meeting").

One skilled in the art will recognize that a multitude of event combinations and permutations are possible and within the scope of this disclosure. One skilled in the art will also recognize that the character, type, and quantity of information delivered and transmission methods for transmitting information to a mobile computing device are numerous and also within the scope of this disclosure.

Figure 4:
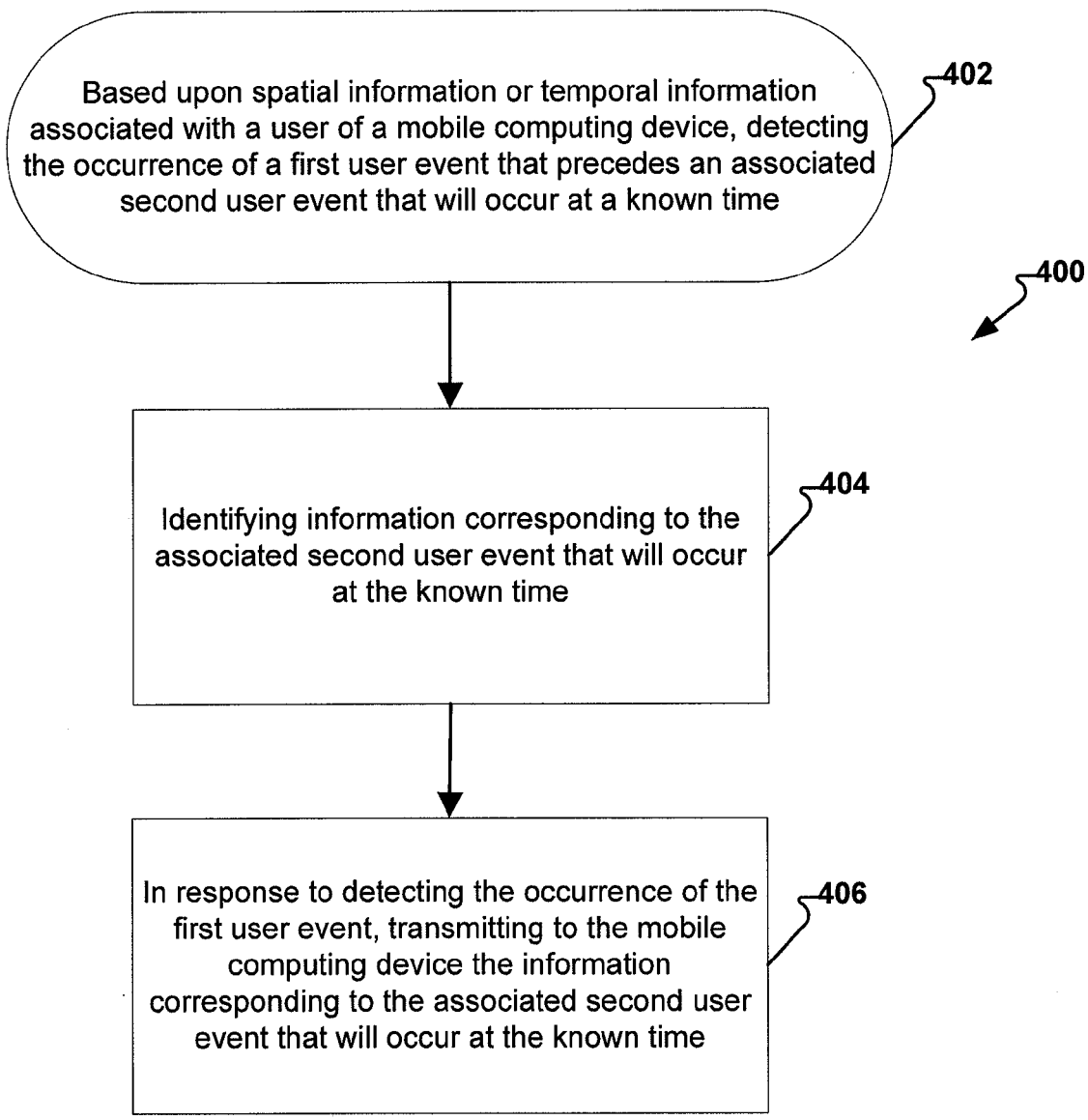
FIG. 4 is a schematic illustrating one embodiment of a method for pre-caching information on a mobile computing device.

FIG. 4 is a schematic illustrating one embodiment of a method 400 for pre-caching information on a mobile computing device. In one embodiment, a method 400 includes, based upon spatial information or temporal information, detecting the occurrence of a first user event that precedes an associated second user event that will occur at a known time in a detecting operation 402. In one embodiment of detecting operation 402, the spatial or temporal information may be associated with a user of a mobile computing device. In one embodiment of detecting operation 402, the spatial information or the temporal information may itself correspond to the first user event. For example, the detection of a first user event in detecting operation 402 may comprise detecting the movement of a mobile computing device to a certain location or from one location to another location. As another example, the detection of a first user event in detecting operation 402 may comprise detecting a time of an event occurring on a mobile computing device. As yet another example, the detection of a first user event in detecting operation 402 may comprise detecting a location that corresponds to an event associated with the user of a mobile computing device. Following this example, a first location associated with a user's calendar entry may be detected such that the first location may precede a second calendar entry associated with a second location.

In one embodiment of detecting operation 402, a first user event may be detected based upon measurement of one or more spatial information values. In one embodiment of method 400, spatial information associated with a user of the mobile computing device may comprises at least one of global positioning system data, Bluetooth data, cellular network data, wireless network data, and wireline network data. For example, spatial information may include information that indicates the physical or geographic location of a mobile computing device. As another example, spatial information may include information that indicates the network location of a mobile computing device, including but not limited to the inclusion within a certain subset of network devices (e.g., a mobile computing device may be associated with a certain service tier that permits display of information corresponding with certain events to the mobile computing device). In another embodiment of detecting operation 402, a first user event may be detected by measuring a spatial information value such as an average or instantaneous speed, an average velocity or instantaneous velocity, a heading or direction of motion, or location data.

In another embodiment of detecting operation 402, a first user event may be detected based upon measurement of one or more temporal information values. In one embodiment, temporal data may comprise a time or duration. For example, a time may be associated with a user event, including but not limited to the beginning time or ending time of a calendar appointment. As another example, a first user event may be detected based upon measurement of a duration of an event. For example, the occurrence of a first user event may be detected upon the first event occurring for a certain or minimum duration such that an associated second user event may occur at a known time following a prior event of a certain duration.

In one embodiment, detecting operation 402 further comprises detecting a unique identifier corresponding to the user of the mobile computing device. In another embodiment, detecting operation 402 may comprise detecting the consumption of information corresponding to the first user event where the information corresponding to the first user event is associated with the user of the mobile computing device. For example, where the first user event comprises displaying a video file of a certain duration or having a certain beginning or ending time, the end of display may itself be detected. In yet another embodiment, a first user event of detecting operation 402 may be associated with another user of another mobile computing device. For example, the presence or absence of another user may result in different information being transmitted to a user's mobile computing device. Following this example, if a user of a mobile computing device has one friend who likes opera and another friend who likes football, the information (e.g., opera history or football scores) transmitted to the user's mobile computing device may depend upon whether the opera-loving friend or football-loving friend is present. In still yet another embodiment, detecting the occurrence of a first user event may further comprise aggregating user event information from a plurality of mobile computing device users. For example, pre-caching may be aided by aggregating and anonymizing user data (e.g., opera lovers, in aggregate, may tend to purchase cough drops prior to an opera).

In one embodiment, a method 400 then includes identifying information corresponding to the associated second user event that will occur at the known time in an identifying information operation 404. One skilled in the art will recognize that the information corresponding to an associated second user event in an identifying information operation 404 may take many forms that are within the scope of this disclosure. For example, where a location (e.g., driving in the direction of work) is detected as the first user event, information may correspond to an associated second user event (e.g., where work comprises the associated second user event, information may be comprised of calendar appointments for work). As another example, where temporal information (e.g., a time coinciding with a user's work hours) is detected as the first user event, information may correspond to an associated second user event (e.g., where a dinner appointment comprises the associated second user event, the information may be comprised of directions to dinner). In one embodiment, an identifying information operation 404 comprises identifying at least one database record associated with a unique identifier corresponding to a user of a mobile computing device where the at least one database record contains information corresponding to an associated second user event that will occur at a known time. In another embodiment, an identifying information operation 404 may comprise identifying information from one or more vendors. In yet another embodiment, an identifying information operation 404 may identifying information from a past user event corresponding to an associated second user event that will occur at a known time.

In one embodiment, a method 400 further includes, in response to detecting the occurrence of the first user event, transmitting to a mobile computing device information corresponding to the associated second user event that will occur at the known time in a transmitting operation 406. In one embodiment, a transmitting operation 406 further comprises receiving compensation from one or more vendors for the transmitting step. In another embodiment, a method 400 may further comprise, upon an occurrence of an associated second user event, consuming at a mobile computing device information corresponding to an associated second used event that will occur at a known time. In a further embodiment, a method 400 may yet further comprise receiving compensation from one or more vendors for the consuming step. In another embodiment, a method 400 may comprise consuming information by displaying information at a mobile computing device where the information corresponds to an associated second user event that will occur at a known time. In yet a further embodiment, a method 400 may further comprise maintaining a user profile for a user of a mobile computing device. For example, a user profile may include at least one of the spatial information, temporal information, the first user event, the associated second user event, and information corresponding to an associated second user event occurring at a known time.

Figure 5:
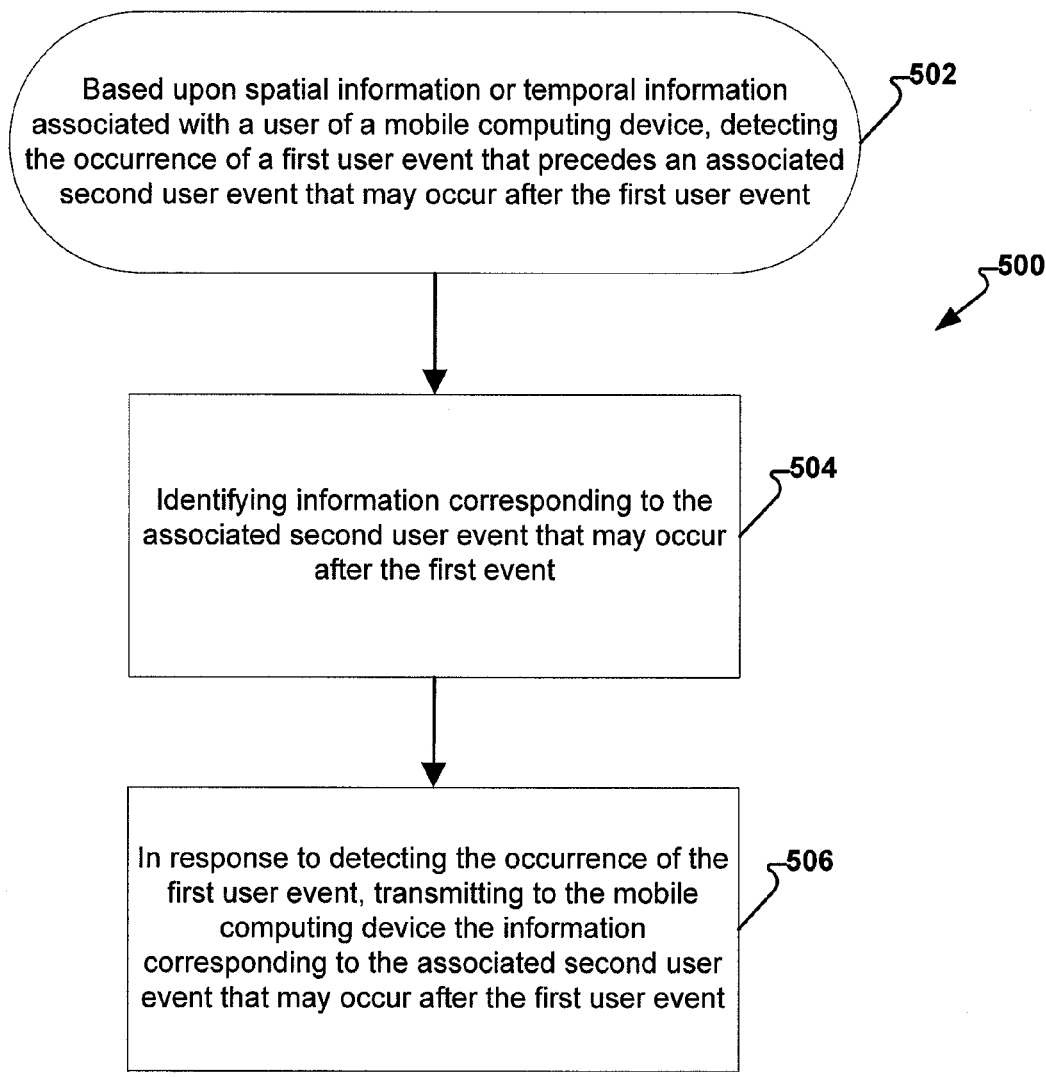
FIG. 5 is a schematic illustrating one embodiment of a method for pre-caching information on a mobile computing device.

FIG. 5 is a schematic illustrating one embodiment of a method 500 for pre-caching information on a mobile computing device. As discussed above, a method 500 may comprise, based upon spatial information or temporal information, detecting the occurrence of a first user event that precedes an associated second user event in a detecting operation 502. In one embodiment of detecting operation 502, the spatial or temporal information may be associated with a user of a mobile computing device. In one embodiment, an associated second user event in a detecting operation 502 may occur after the first user event, but may not occur at a known time. For example, a detecting operation 502 may comprise detecting a first user event as a change in the location (e.g., within a mile of a coffee shop) of a mobile computing device, whereupon a second associated event may occur such as a user visiting a second location (e.g., visiting the coffee shop). In one embodiment of method 500, information corresponding to an associated second user event that may occur after the first event is then identified in an identifying information operation 504. Following the previous example, a coupon or advertisement, or data representing the same, for the coffee shop may comprise the information identified in an identifying information operation 504. In a further embodiment of method 500, in response to detecting the occurrence of a first user event, information corresponding to an associated second user event that may occur after the first user event is transmitting to a mobile computing device in a transmitting operation 506. By way of further illustration, the coupon or advertisement, or information representing a coupon or advertisement, set forth as an example of information in an identifying information operation 504 may be transmitted to a mobile computing device in a transmitting operation 506.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. For example, information transmitted to a mobile computing device may be assigned a transmission priority and/or consumption priority. In one embodiment, one vendor may pay to prioritize the transmission or consumption of their information with a higher priority than a priority of information corresponding to a second vendor. As another example, information corresponding to an associated second user event may comprise predicting a second user event based upon a comparison against aggregate user events. As one example, an analysis of user event data may suggest that an associated second user event (e.g., going to a pharmacy) may be likely to occur for a group of users of mobile computing devices following a certain first user event (e.g., the location of a mobile computing device at a hospital or medical facility). As yet another example, information transmitted to a user's mobile computing device and/or the user's actions or events may further result in pre-caching information on another user's mobile computing device. For example, where one user's mobile computing device heads towards or arrives at a certain location (e.g., a concert), information (e.g., information describing the concert and concert venue) may be pre-cached to other users (e.g., friends of the first user) mobile computing devices.

Numerous other changes may be made which will readily suggest themselves to those skilled in the art and which are encompassed in the spirit of the invention disclosed and as defined in the appended claims.

What is claimed is:

1. A method comprising:
    detecting, by a remote computing device, the occurrence of a first user event that precedes an associated second user event, wherein the first user event comprises a temporal or spatial event associated with a mobile device and wherein the second user event comprises a scheduled user event;
    identifying, by the remote computing device, first information corresponding to the associated second user event, the first information comprising spatial information or temporal information;
    determining, by the remote computing device, a first priority of the first information associated with the second user event;
    determining, by the remote computing device, a second priority of a second information associated with the second user event, the second information comprising a coupon for the second user event;
    determining, by the remote computing device, that the first priority is higher than the second priority;
    in response to detecting the occurrence of the first user event, transmitting, by the remote computing device to a mobile computing device, the first information having the first priority before transmitting the second information having the second priority; and transmitting, by the remote computing device to the mobile computing device, the second information having the second priority after transmitting the first information so that the second information is pre-cached on the mobile computing device before the occurrence of the second user event.

2. The method of claim 1, further comprising determining an amount of time between the first user event and the second user event.

3. The method of claim 2, wherein the amount of time corresponds to a size of the first information.

4. The method of claim 2, wherein if the amount of time is less than a predetermined amount of time, transmitting the first information having the first priority before transmitting the second information having the second priority.

5. The method of claim 1, wherein the first priority and the second priority are consumption priorities.

6. The method of claim 1, wherein the first priority and the second priority are transmission priorities.

7. The method of claim 1, wherein the first information is associated with a vendor.

8. The method of claim 7, further comprising receiving payment from the vendor to prioritize the first information at the first priority.

9. A system comprising:
a processor;
a storage medium for tangibly storing thereon program logic for execution by the processor, the program logic comprising:
detection logic executed by the processor for detecting the occurrence of a first user event that precedes an associated second user event, wherein the first user event comprises a temporal or spatial event associated with a mobile device and wherein the second user event comprises a scheduled user event;
identifying logic executed by the processor for identifying first information corresponding to the associated second user event, the first information comprising spatial information or temporal information;
first determining logic executed by the processor for determining a first priority of the first information associated with the second user event;
second determining logic executed by the processor for determining a second priority of a second information associated with the second user event, the second information comprising a coupon for the second user event;
third determining logic executed by the processor for determining that the first priority is higher than the second priority;
first transmitting logic executed by the processor for transmitting, in response to detecting the occurrence of the first user event, to a mobile computing device, the first information having the first priority before transmitting the second information having the second priority;
second transmitting logic executed by the processor for transmitting, to the mobile computing device, the second information having the second priority after transmitting the first information so that the second information is pre-cached on the mobile computing device before the occurrence of the second user event.

10. The system of claim 9, further comprising fourth determining logic executed by the processor for determining an amount of time between the first user event and the second user event.

11. The system of claim 10, wherein the amount of time corresponds to a size of the first information.

12. The system of claim 10, wherein if the amount of time is less than a predetermined amount of time, transmitting the first information having the first priority before transmitting the second information having the second priority.

13. The system of claim 9, wherein the first priority and the second priority are consumption priorities.

14. The system of claim 9, wherein the first priority and the second priority are transmission priorities.

15. The system of claim 9, wherein the first information is associated with a vendor.

16. The system of claim 15, further comprising receiving logic executed by the processor for receiving a payment from the vendor to prioritize the first information at the first priority.

17. A non-transitory computer readable storage medium having computer readable program code in the medium for causing a processor to precache information, the computer readable program code comprising instructions that enable the processor to:
detect the occurrence of a first user event that precedes an associated second user even, wherein the first user event comprises a temporal or spatial event associated with a mobile device and wherein the second user event comprises a scheduled user event;
identify first information corresponding to the associated second user event, the first information comprising spatial information or temporal information;
determine a first priority of the first information associated with the second user event;
determine a second priority of a second information associated with the second user event, the second information comprising a coupon for the second user event;
determine that the first priority is higher than the second priority;
in response to detecting the occurrence of the first user event, transmit, to a mobile computing device, the first information having the first priority before transmitting the second information having the second priority;
transmit, to the mobile computing device, the second information having the second priority after transmitting the first information so that the second information is pre-cached on the mobile computing device before the occurrence of the second user event.

18. The medium of claim 17, further comprising code comprising instructions to enable the processor to determine an amount of time between the first user event and the second user event.

19. The medium of claim 18, wherein the amount of time corresponds to a size of the first information.

20. The medium of claim 18, wherein if the amount of time is less than a predetermined amount of time, transmitting the first information having the first priority before transmitting the second information having the second priority.

* * * * *